US012595693B2

(12) United States Patent
Moschet et al.

(10) Patent No.: US 12,595,693 B2
(45) Date of Patent: Apr. 7, 2026

(54) TRACTION BATTERY SECURING ASSEMBLY AND METHOD

(71) Applicant: Ford Global Technologies, LLC, Dearborn, MI (US)

(72) Inventors: Dave Moschet, Novi, MI (US); James Lawrence Swoish, Northville, MI (US); Saravanan Paramasivam, South Lyon, MI (US); Rajaram Subramanian, Ann Arbor, MI (US); Himanshu Khandelwal, Warren, MI (US); Peter Conis, Berkley, MI (US); Juan Carlos Leal Rodriguez, Farmington Hills, MI (US); Ali Saad, Troy, MI (US); Melissa Kathryn Christensen, New Hudson, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1113 days.

(21) Appl. No.: 17/216,470

(22) Filed: Mar. 29, 2021

(65) Prior Publication Data

US 2022/0307301 A1 Sep. 29, 2022

(51) Int. Cl.
| | |
|---|---|
| *E05C 3/12* | (2006.01) |
| *B60K 1/04* | (2019.01) |
| *H01M 50/249* | (2021.01) |
| *H01M 50/262* | (2021.01) |

(52) U.S. Cl.
CPC ................ *E05C 3/124* (2013.01); *B60K 1/04* (2013.01); *H01M 50/249* (2021.01); *H01M*

*50/262* (2021.01); *B60K 2001/0438* (2013.01); *H01M 2220/20* (2013.01)

(58) Field of Classification Search
CPC ....................................................... E05C 3/124
See application file for complete search history.

(56) References Cited

U.S. PATENT DOCUMENTS

| | | | | |
|---|---|---|---|---|
| 2006/0244421 A1* | 11/2006 | Narendran | .......... | H01M 10/425 |
| | | | | 320/132 |
| 2019/0045897 A1* | 2/2019 | Bhatnagar | .......... | H01M 50/247 |

FOREIGN PATENT DOCUMENTS

| | | | | | |
|---|---|---|---|---|---|
| CN | 104937740 A | * | 9/2015 | .......... | H01M 2/1077 |
| CN | 208385508 | | 1/2019 | | |
| CN | 209389105 | | 9/2019 | | |
| DE | 102019206893 A1 | * | 11/2020 | | |
| JP | 2012221780 A | * | 11/2012 | .............. | B25F 5/00 |
| KR | 102075097 | | 2/2020 | | |
| WO | WO-2019164486 A1 | * | 8/2019 | ............. | B60L 53/30 |

* cited by examiner

*Primary Examiner* — Nicole M. Buie-Hatcher
*Assistant Examiner* — Krishna R Hammond
(74) *Attorney, Agent, or Firm* — David B. Kelley; Carlson, Gaskey & Olds, P.C.

(57) ABSTRACT

A battery pack assembly includes, among other things, a tray and a lid. The lid is secured to the tray to provide an enclosure having an interior. At least one battery module is disposed within the interior. A cross-member is disposed within the interior adjacent to at least one battery module. A touch latch secures the tray or the lid to the cross-member.

15 Claims, 4 Drawing Sheets

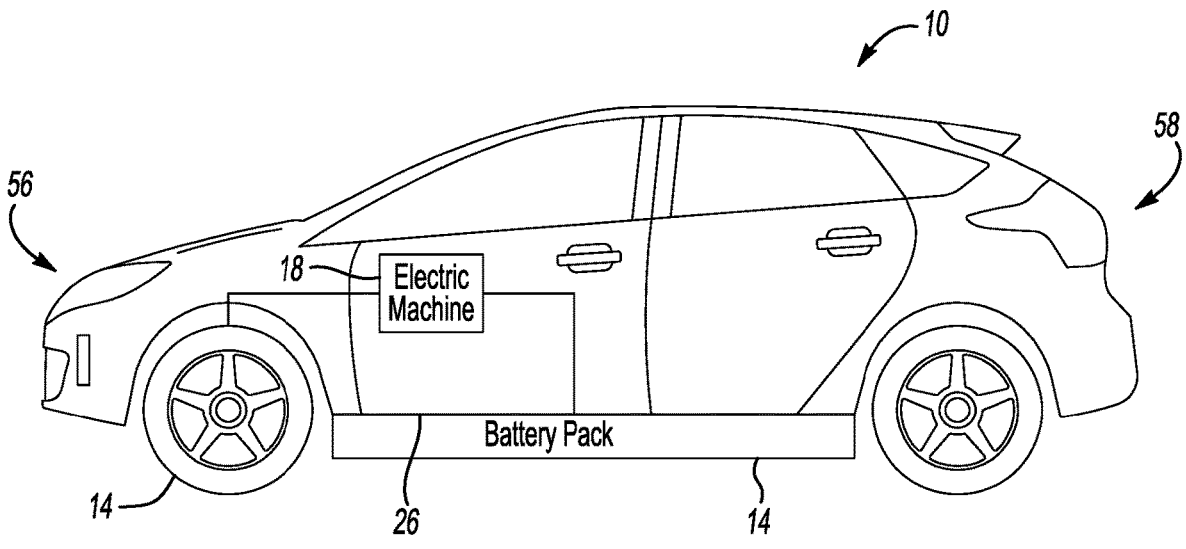
_Fig-1_
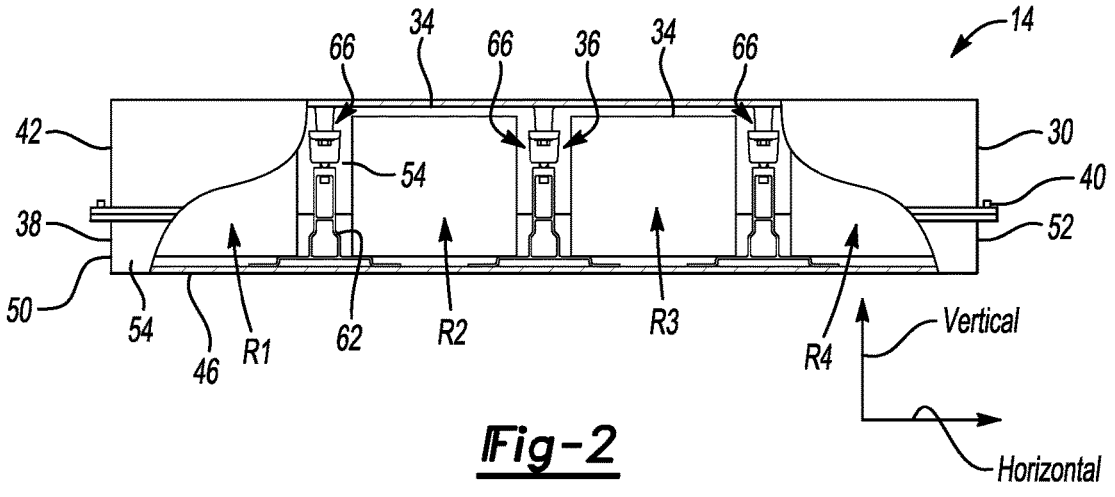
_Fig-2_

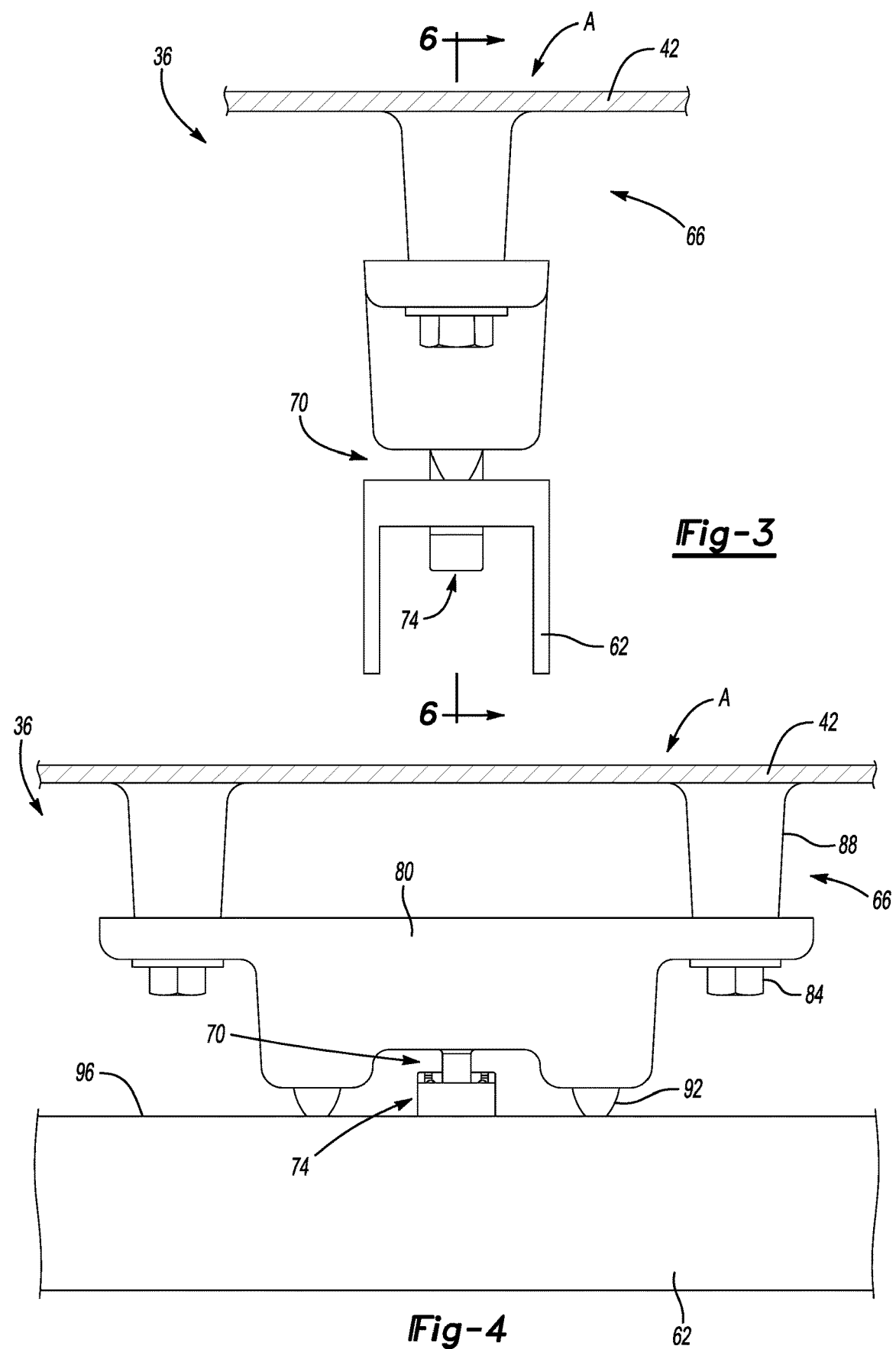
_Fig-3_
_Fig-4_

TRACTION BATTERY SECURING ASSEMBLY AND METHOD

TECHNICAL FIELD

This disclosure relates generally to securing portions of a traction battery and, more particularly, to securing areas of an enclosure relative to components within the enclosure.

BACKGROUND

Electrified vehicles differ from conventional motor vehicles because electrified vehicles can be driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

SUMMARY

A battery pack assembly according to an exemplary aspect of the present disclosure includes, among other things, a tray and a lid. The lid is secured to the tray to provide an enclosure having an interior. At least one battery module is disposed within the interior. A cross-member is also disposed within the interior and is adjacent to the battery module. A touch latch secures the tray or the lid to the cross-member.

In another example of the foregoing assembly, the touch latch is a push-push latch.

In another example of any of the foregoing assemblies, the touch latch is a magnetic latch.

In another example of any of the foregoing assemblies, the touch latch is disposed entirely within the interior.

In another example of any of the foregoing assemblies, the touch latch directly secures the lid to the cross-member.

In another example of any of the foregoing assemblies, no portion of the touch latch extends outside the interior.

In another example of any of the foregoing assemblies, the touch latch is configured to be transitioned between an engaged state and a disengaged state from outside the interior.

In another example of any of the foregoing assemblies, the tray includes a forward wall, an aft wall, and opposing side walls extends horizontally from the forward wall to the aft wall. The cross-member extends along a cross-member axis between the opposing side walls of the tray.

In another example of any of the foregoing assemblies, fasteners secure the lid to the tray. The fasteners are distributed circumferentially about the perimeter of the enclosure.

Another example of any of the foregoing assemblies includes a first and second portion of the touch latch. The first portion is secured to the lid. The second portion is secured to the cross-member. The first portion engages the second portion when the latch is securing the lid to the cross-member In another example of any of the foregoing assemblies, the second portion is secured to upwardly facing surface of the cross-member.

In another example of any of the foregoing assemblies, the first portion is a striker, and the second portion is an engaging detent.

Another example of any of the foregoing assemblies includes at least one bumper contacting the upwardly facing surface of the cross member when the touch latch is in an engaged state.

In another example of any of the foregoing assemblies, wherein the touch latch comprises a hook-and-loop fastener.

A method of securing portions of a traction battery pack according to yet another exemplary aspect of the present disclosure includes, among other things, housing a component of the traction battery pack within an interior of an enclosure of the traction battery pack. The method further includes securing a portion of the enclosure to the component using a touch latch.

Another example of any of the foregoing methods includes transitioning the touch latch back and forth between an engaged state and a disengaged state without accessing the interior.

In another example of any of the foregoing methods, the touch latch is secured to the enclosure with a fastener. The fastener is disposed entirely within the interior.

In another example of any of the foregoing methods, the touch latch is a push-push latch.

BRIEF DESCRIPTION OF THE FIGURES

The various features and advantages of the disclosed examples will become apparent to those skilled in the art from the detailed description. The figures that accompany the detailed description can be briefly described as follows:

FIG. 1 illustrates a side view of an electrified vehicle.

FIG. 2 illustrates a schematic view of a battery pack from the electrified vehicle of FIG. 1 with selected portions of an enclosure removed to show battery modules and cross-members within an interior of the enclosure.

FIG. 3 illustrates a close-up view of a touch latch within the battery pack of FIG. 2 when the touch latch is in an engaged state.

FIG. 4 illustrates a side view of the touch latch of FIG. 3.

DETAILED DESCRIPTION

Figures 5, 6:
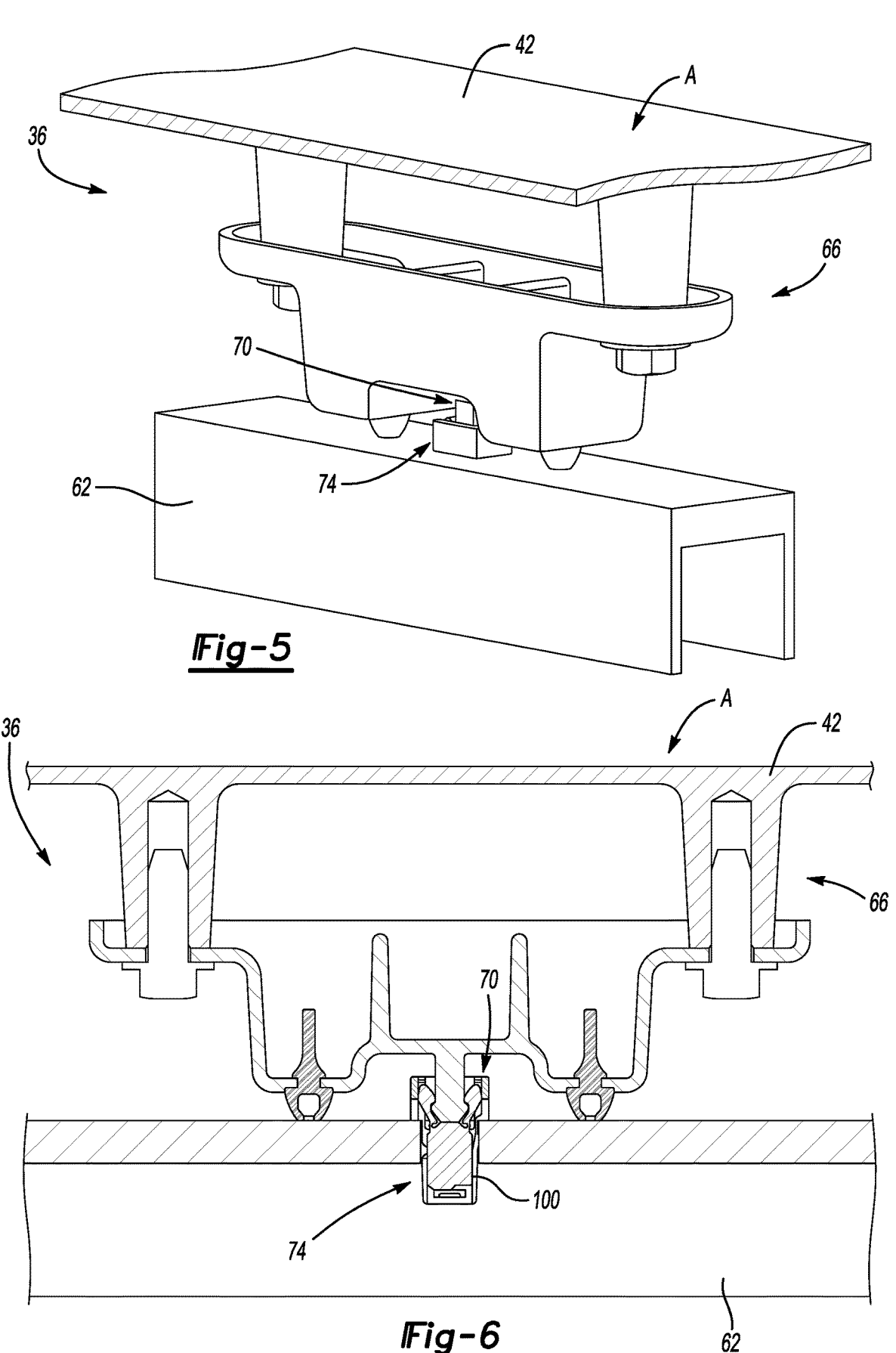
FIG. 5 illustrates a perspective view of the touch latch of FIG. 3.
FIG. 6 illustrates a section taken along line 6-6 in FIG. 3.

Electrified vehicles include at least one traction battery pack. This disclosure relates to securing portions of the traction battery pack.

A typical traction battery pack includes an enclosure having an interior. Many components are held within the interior. Securing portions of the enclosure can help to reduce noise, vibration, harshness (NVH) issues associate with the enclosure. Many techniques for securing the enclosure introduce potential leak paths to the interior.

With reference to FIG. 1, an electrified vehicle 10, in an exemplary non-limiting embodiment, includes a traction battery pack 14 that powers an electric machine 18. The electrified vehicle 10 further includes wheels 22 driven by the electric machine 18. The battery pack 14 can power the electric machine 18, which converts electric power to torque to drive the wheels 22. The battery pack 14 can be a relatively high-voltage battery.

The battery pack 14 is, in the exemplary embodiment, secured to an underbody 26 of the electrified vehicle 10. The battery pack 14 could be located elsewhere on the electrified vehicle 10 in other examples. The battery pack 14 can be secured to the underbody 26 using straps and mechanical fasteners, for example.

The electrified vehicle 10 is an all-electric vehicle. In other examples, the electrified vehicle 10 is a hybrid electric vehicle, which selectively drives wheels using torque provided by an internal combustion engine instead, or in addition to, an electric machine. Generally, the electrified vehicle 10 could be any type of vehicle having a traction battery pack.

Referring now to FIG. 2 with continuing reference to FIG. 1, the battery pack 14 includes an enclosure 30 housing battery modules 34.

The enclosure 30, in the exemplary non-limiting embodiment includes a tray 38 and lid 42. The lid 42 is secured to the tray 38 to provide an interior 36. The battery modules 34 are located within the interior 36 along with other components. The lid 38, the tray, or both, can be a polymer or polymer-based material.

A plurality of mechanical fasteners 40 are distributed about a periphery of the interior 36. The mechanical fasteners 40 secure a flange of the tray 38 to a flange of the lid 42.

A sealing interface can be provided between the fasteners 40 and the interior 36. As the fasteners 40 are disposed outside the sealing interface, the mechanical fasteners do not extend through apertures that could act as potential leak paths to and from the interior 36. That is, when the lid 42 can be secured to the tray 38 a circumferentially continuous seal is maintained about a perimeter of the interior 36.

The exemplary tray 38 includes a floor 46, a forward wall 50, an aft wall 52, and opposing side walls 54 that extend horizontally from the forward wall to the aft wall 52. Vertical and horizontal, for purposes of this disclosure, are with reference to ground and the ordinary orientation of the electrified vehicle 10 during operation. Forward and aft are also with reference to the orientation of the electrified vehicle 10, that is, the forward wall 50 is closer to a front 56 of the electrified vehicle 10 than the aft wall 52. Also, the aft wall 52 is closer to a rear 58 of the electrified vehicle 10 than the forward wall 50.

A plurality of cross-members 62 are disposed within the interior 36 of the enclosure 30. The cross-members 62 each extend longitudinally along a respective cross-member axis, which extends in a cross-vehicle direction and in a direction perpendicular to the plane of the page in FIG. 2. The cross-members 62, in the exemplary embodiment, extend from one of the side walls 54 to the opposing side wall 54. That is, in the exemplary embodiment, the cross-members 62 directly contact both of the side walls 54.

The cross-members 62 are each spaced a distance from each other and from both the forward wall 50 and the aft wall 52 of the tray 38. The cross-members 62 enhance the structural integrity of the battery pack 14. In the exemplary embodiment, the cross-members 62 are also utilized to support the battery modules 34 at a position where the battery modules 34 are elevated with respect to the floor 46 of the tray 38.

The battery modules 34, in the exemplary embodiment, are arranged in four rows R1, R2, R3, and R4. R1 is forward of rows R2-R4. R2 is forward of rows R3 and R4. Row R3 is forward of row R4. Along a longitudinal axis of the electrified vehicle 10, one of the cross-members 62 is used to support the battery modules 34 in rows R1 and R2. Another of the cross-members 62 is used to support the battery modules 34 in rows R2 and R3. The remaining cross-member 62 is utilized to support the battery modules 34 in rows R3 and R4.

Other exemplary battery packs could include other arrangements of battery modules and cross-members. Another battery pack could, for example, include more than four rows of battery modules. Yet another battery pack could include more than one vertical tier of battery modules.

Areas of the enclosure 30 spanning relatively large distances without being secured to another structure may be more prone to NVH issues than other areas of the enclosure 30, especially when the enclosure 30 is a polymer-based material. A fastener that extends through an aperture in the enclosure 30 can introduce a potential leak path between the interior 36 and the areas surrounding the battery pack 14.

In the exemplary embodiment, a plurality of touch latches 66 secure the lid 42 to one or more components within the interior 36. Securing the lid 42 to the components can decrease the distances that the lid 42 spans thus helping to mitigate NVH issues associated with the lid 42. In particular, reducing the distance that the lid 42 is required to span can increase local frequency modes of the lid 42 and prevent sagging of the lid 42. In this example, the touch latches 66 secure the lid 42 to the cross-members 62. In another example, the touch latches 66 secure the lid 42 to covers of the battery modules 34.

Notably, the touch latches 66 can be transitioned between an engaged state with the cross-members 62 and a disengaged state without requiring a tool or user to access the interior 36 of the battery pack 14. That is, the touch latches 66 can secure areas of the lid 42 without introducing potential leak paths.

If servicing the battery pack 14 is ever required, the touch latches 66 can be transitioned to a disengaged state from outside the interior 36. The fasteners 40 can also be removed so that the lid 42 can be separated from the tray 38.

FIGS. 3-7 show one of the touch latches 66 of the exemplary battery pack 14. The touch latch 66 is a push-push latch.

The touch latch 66 can transition between an engaged state and a disengaged state in response to a user pressing on an area A of the lid 42. The area A is directly vertically above the touch latch 66. Notably, the touch latch 66 is disposed entirely within the interior 36. That is, no portion of the touch latch 66 extends outside the interior 36.

In the exemplary embodiment, the touch latch 66 include a first portion 70 that is secured to the lid 42, and a second portion 74 that is secured to the cross-member 62. The first portion 70 is in an engaged state with the second portion 74 when the touch latch 66 is securing the lid 42 to the cross-member 62. The lid 42 is polymer-based in this example.

In the exemplary embodiment, the first portion 70 comprises a striker and the second portion 74 comprises an engageable detent. When the area A of the lid 42 is pressed vertically downward relative to the cross-member 62, the striker is forced from the position of FIG. 7 into the engageable detent. The engageable detent then grasps the striker as shown in FIGS. 3-6 to hold the touch latch 66 in the engaged state. Pressing the area A again moves the engageable detent downward to release the engageable detent. A biasing device can then press the engageable detent upward away from the cross-member 62 to release the striker. The touch latch 66 is then in the disengaged state so that the first portion 72 can then be separated from the second portion 74.

In the exemplary embodiment, the first portion of the touch latch 66 includes a housing 80 in addition to the striker. Mechanical fasteners 84 threadably engage bosses extending from an underside 88 of the lid 42 to secure the housing 80 relative to the lid 42.

Bumpers 92 are secured to the housing 80 of the example touch latch 66. When the touch latch 66 is in the engaged state, the bumpers 92 are compressed between the housing 80 and an upper surface 96 of the cross-member 62 to further mitigate NVH issues.

In the exemplary embodiment, the second portion of the touch latch 66 is secured directly to the cross-member 62. The second portion is held within an aperture 100 within the cross-member 62.

Figures 7, 8:
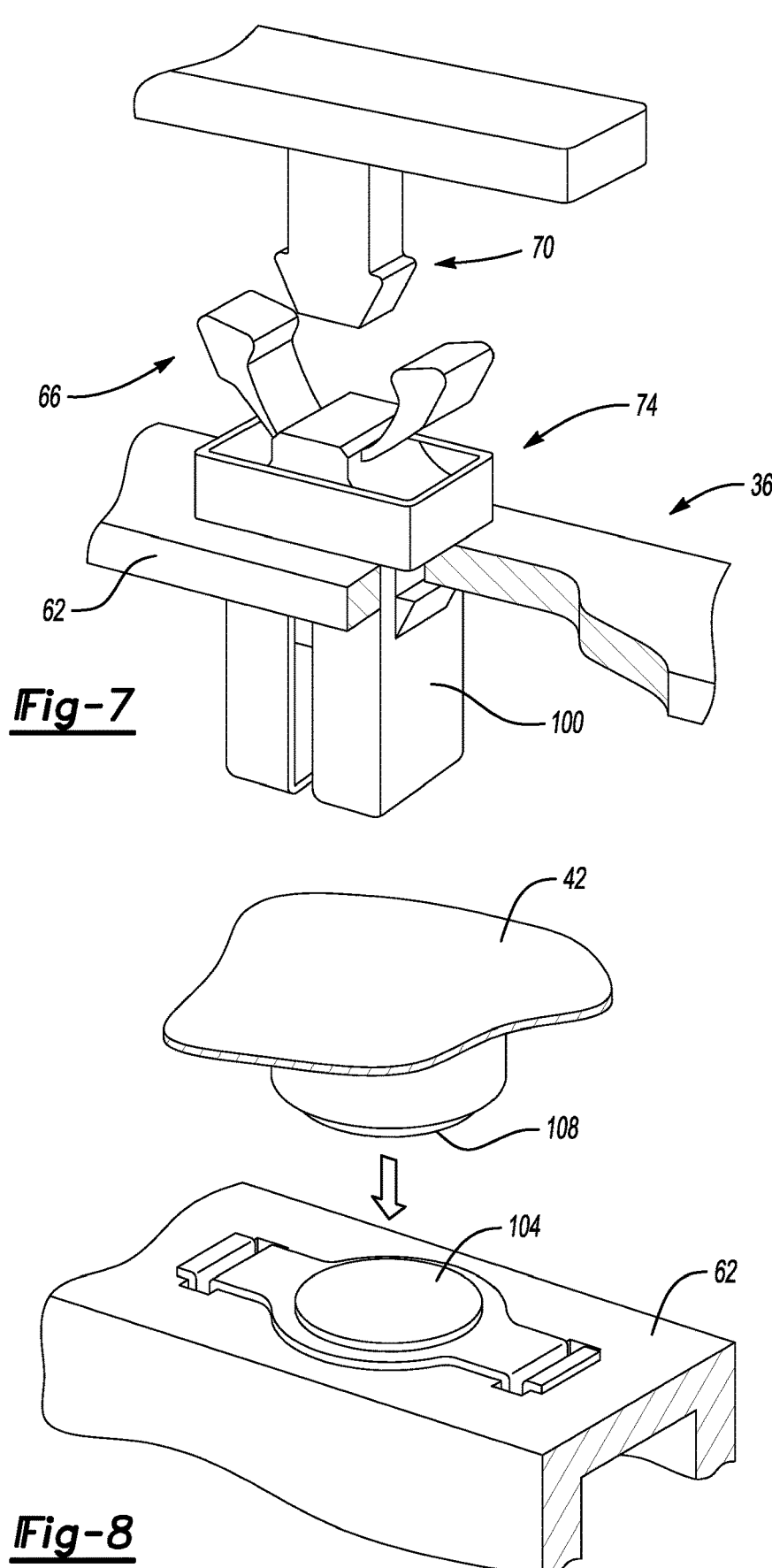
FIG. 7 illustrates a close-up view of portions of the touch latch when the touch latch is in a disengaged state.
FIG. 8 shows a touch latch according to another exemplary aspect of the present disclosure.

With reference now to FIG. 8, a touch latch 66A, in another example, comprises magnets. The touch latch 66A is a push-on/pull-off latch. In the example touch latch 66A, a magnet 104 is directly secured to an upwardly facing surface of the cross-member 62. Another magnet 108 is secured to an underside of the lid 42. The magnets 104 and 108 are attracted to one another. The magnets 104 and 108 can be held in respective brackets.

When positioned proximate each other, the magnets 104 and 108 pull against one another to secure the lid 42 relative to the cross-member 62. The attraction between the magnets 104 and 108 can be adjusted so that the force is sufficient to secure the lid 42 relative to the cross-member 62 during ordinary operation of the electrified vehicle 10. When servicing the battery pack is required, the lid 42 can be pulled away from the cross-member 62 to disengaging the magnets 104 and 108.

In yet another example, the touch latch could comprise a duel lock fastener such as a hook-and-loop fastener. For instance, a strip of hooks could be adhesively secured to the lid 42, and a strip of loops could be adhesively secured to a cover of the modules 34. The strip of hooks engages the strip of loops when the lid 42 is pressed against the strip of hooks. The lid 42 can be pulled away from the cover of the modules 34 to disengage the strip of hooks from the strip of loops.

The embodiments of this disclosure are described in connection with a mechanical latch, here a touch latch, connecting a lid to a cross-member. Other examples could include the touch latch connecting another area of the enclosure, such as a tray to a component within the interior. The component within the enclosure that connects to the lid or the tray is the cross-member in the exemplary embodiments. The components could be components other than the cross-members, such as the battery modules, for example.

Features of the disclosed examples include reducing sag of the lid or other areas of the enclosure that can lead to the enclosure undesirably contacting components within the enclosure. Another feature is reducing NVH.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A traction battery assembly, comprising:
   a tray;
   a lid secured to the tray to provide an enclosure having an interior;
   at least one battery module disposed within the interior;
   a cross-member disposed within the interior adjacent to the at least one battery module; and
   a touch latch that secures the tray or the lid to the cross-member.

2. The traction battery assembly of claim 1, wherein the touch latch is a push-push latch.

3. The traction battery assembly of claim 1, wherein the touch latch is a magnetic latch.

4. The traction battery assembly of claim 1, wherein the touch latch is disposed entirely within the interior.

5. The traction battery assembly of claim 1, wherein the touch latch directly secures the lid to the cross-member.

6. The traction battery assembly of claim 1, wherein no portion of the touch latch extends outside the interior.

7. The traction battery assembly of claim 1, wherein the touch latch is configured to be transitioned between an engaged state and a disengaged state from outside the interior.

8. The traction battery assembly of claim 1, wherein the tray further includes a forward wall, an aft wall, and opposing side walls extending horizontally from the forward wall to the aft wall, wherein the cross-member extends along a cross-member axis between the opposing side walls of the tray.

9. The traction battery assembly of claim 1, wherein a plurality of fasteners secured the lid to the tray, the plurality of fasteners distributed circumferentially about a perimeter of the enclosure.

10. The traction battery assembly of claim 1, further comprising a first and a second portion of the touch latch, the first portion secured to the lid, the second portion secured to the cross-member, the first portion engaging the second portion when the touch latch is securing the lid to the cross-member.

11. The traction battery assembly of claim 10, wherein the second portion is secured to an upwardly facing surface of the cross-member.

12. The traction battery assembly of claim 11, wherein the first portion is a striker, wherein the second portion is an engaging detent.

13. The traction battery assembly of claim 12, further comprising at least one mechanical fastener that fastens to the lid to secure the first portion to the lid.

14. The traction battery assembly of claim 13, further comprising at least one bumper contacting the upwardly facing surface of the cross-member when the touch latch is in the engaged state.

15. The traction battery assembly of claim 1, wherein the touch latch comprise a hook-and-loop fastener.

\* \* \* \* \*